United States Patent
Hunt

(10) Patent No.: US 9,734,401 B2
(45) Date of Patent: Aug. 15, 2017

(54) DETECTION AND TRACKING OF ITEM FEATURES

(71) Applicant: RoboticVISIONTech, Inc., Silver Spring, MD (US)

(72) Inventor: Shawn Hunt, Pinckney, MI (US)

(73) Assignee: RoboticVISIONTech, Inc., Silver Spring, MD (US)

( * ) Notice: Subject to any disclaimer, the term of this patent is extended or adjusted under 35 U.S.C. 154(b) by 112 days.

(21) Appl. No.: 14/432,466

(22) PCT Filed: Aug. 8, 2014

(86) PCT No.: PCT/US2014/050403
§ 371 (c)(1),
(2) Date: Mar. 30, 2015

(87) PCT Pub. No.: WO2016/022154
PCT Pub. Date: Feb. 11, 2016

(65) Prior Publication Data
US 2016/0042517 A1 Feb. 11, 2016

(51) Int. Cl.
- *G06K 9/20* (2006.01)
- *G06K 9/36* (2006.01)
- *G06T 7/60* (2017.01)
- *G06K 9/00* (2006.01)
- *G06T 7/246* (2017.01)

(52) U.S. Cl.
CPC .......... *G06K 9/00664* (2013.01); *G06T 7/246* (2017.01); *G05B 2219/40565* (2013.01)

(58) Field of Classification Search
None
See application file for complete search history.

(56) References Cited

U.S. PATENT DOCUMENTS

| | | | |
|---|---|---|---|
| 6,816,755 B2 | 11/2004 | Habibi et al. | |
| 7,957,853 B2 | 6/2011 | Stock et al. | |
| 8,620,087 B2 * | 12/2013 | Iwamoto | G06K 9/623 382/159 |

(Continued)

OTHER PUBLICATIONS

Canny, J., "A Computational Approach to Edge Detection," IEEE Transactions on Pattern Analysis and Machine Intelligence, vol. PAMI-8, No. 6, pp. 679-698 (Nov. 1986).

(Continued)

*Primary Examiner* — Brian P Werner
(74) *Attorney, Agent, or Firm* — Turk IP Law, LLC

(57) ABSTRACT

Technologies are generally described for detection and tracking of item features. In some examples, features of an object may be initially found through detection of one or more edges and one or more corners of the object from a first perspective. In addition, determination may be made whether the detected edges and corners of the object are also detectable from one or more other perspectives. In response to an affirmative determination, the detected edges and of the object may be marked as features to be tracked, for example, in subsequent frames of a camera feed. The perspectives may correspond to distributed locations in a substantially umbrella-shaped formation centered over the object. In other examples, lighting conditions of an environment where the object is being tracked may be programmatically controlled.

18 Claims, 9 Drawing Sheets

(56) References Cited

U.S. PATENT DOCUMENTS

| | | |
|---|---|---|
| 2005/0265582 A1 | 12/2005 | Buehler et al. |
| 2007/0073439 A1 | 3/2007 | Habibi et al. |
| 2010/0135760 A1 | 6/2010 | Hjornet |
| 2011/0205240 A1 | 8/2011 | Marks et al. |
| 2013/0288214 A1* | 10/2013 | Kesavadas ............ G09B 23/285 434/262 |
| 2014/0340926 A1* | 11/2014 | Komukai ............ G02B 23/2469 362/553 |

OTHER PUBLICATIONS

Hunt, S. "Robotic Goal-Based Semi-Autonomous Algorithms Improve Remote Operator Performance," Wayne State University Dissertations, pp. 160 (Jan. 1, 2010).

International Search Report and Written Opinion for International Application No. PCT/US2014/050403 mailed Nov. 25, 2014.

Shi, J., and Tomasi, C., "Good features to track," IEEE Computer Society Conference on Computer Vision and Pattern Recognition, pp. 593-600 (Jun. 21-23, 1994).

\* cited by examiner

COMPUTER PROGRAM PRODUCT 800

SIGNAL BEARING MEDIUM 802

804 ONE OR MORE INSTRUCTIONS TO

DETECT ONE OR MORE EDGES AND ONE OR MORE CORNERS OF AN ITEM FROM A FIRST PERSPECTIVE;
    DETERMINE WHETHER THE DETECTED ONE OR MORE EDGES AND ONE OR MORE CORNERS OF THE ITEM ARE DETECTABLE FROM AT LEAST A SECOND PERSPECTIVE;
    IN RESPONSE TO A DETERMINATION THAT THE DETECTED ONE OR MORE EDGES AND ONE OR MORE CORNERS OF THE ITEM ARE ALSO DETECTABLE FROM AT LEAST THE SECOND PERSPECTIVE, MARK THE DETECTED ONE OR MORE EDGES AND ONE OR MORE CORNERS OF THE ITEM AS FEATURES TO BE TRACKED; AND
    TRACK THE ITEM THROUGH MULTIPLE FRAMES USING THE FEATURES.

| COMPUTER-READABLE MEDIUM 806 | RECORDABLE MEDIUM 808 | COMMUNICATIONS MEDIUM 810 |

FIG. 8

DETECTION AND TRACKING OF ITEM FEATURES

CROSS-REFERENCE TO RELATED APPLICATION

This Application is the U.S. National Stage filing under 35 U.S.C. §371 of International Application No. PCT/US14/50403, filed on Aug. 8, 2014. The disclosure of the International Application is herein incorporated by reference in its entirety.

BACKGROUND

Unless otherwise indicated herein, the materials described in this section are not prior art to the claims in this application and are not admitted to be prior art by inclusion in this section.

In various environments, items may need to be tracked as the items or monitoring cameras used in tracking the items move. For example, in manufacturing environments, a wide variety of parts may need to be identified and tracked as they move on assembly bands and are processed (for example, assembled, tested, or otherwise treated) by robotic equipment. Robotic equipment is typically more precise, faster, and cost-effective compared to human counterparts in performing repetitive tasks or operations that require precision. However, while a human can easily identify a part and place it in a proper position for the task at hand, a robot may not be able to identify the same part if it is not in a precisely selected position or there are variations from part to part. Providing the preciseness in part selection and positioning prior to processing by the robotic equipment may result in increased cost and delays. For example, special positioning mechanisms may have to be installed for each robotic equipment in an assembly band that includes a number of robotic stations.

Detecting an item based on its features may not be adequate for robotic processing environments. Tracking the item through one or more environments may also be needed. In many environments, lighting conditions may change throughout the day or as people and other machines move around. Thus, current detection and tracking methods and the implementation thereof could use improvements and/or alternative or additional solutions in order to provide and promote reliable item tracking.

SUMMARY

The present disclosure generally describes techniques to implement detection and tracking of item features.

According to some examples, methods to implement detection and tracking of item features are described. Example methods may include detecting one or more edges and one or more corners of an item from a first perspective, determining whether the detected one or more edges and one or more corners of the item are detectable from at least a second perspective, and marking the detected one or more edges and one or more corners of the item as features to be tracked in response to a determination that the detected one or more edges and one or more corners of the item are also detectable from at least the second perspective.

According to other examples, an apparatus configured to implement detection and tracking of item features is described. An example apparatus may include at least on image capture module configured to capture images of an item from a plurality of perspectives and at least one analysis module communicatively coupled to the at least on image capture module. The at least one analysis module may be configured to detect one or more edges and one or more corners of the item from a first perspective, determine whether the detected one or more edges and one or more corners of the item are detectable from at least a second perspective, and mark the detected one or more edges and one or more corners of the item as features to be tracked in response to a determination that the detected one or more edges and one or more corners of the item are also detectable from at least the second perspective.

According to further examples, a system to implement detection and tracking of item features is described. An example system may include at least on image capture module configured to capture images of an item from a plurality of perspectives; at least one positioning module mechanically coupled to the at least one image capture module, the at least one positioning module configured to move the at least one image capture module to a plurality of positions in a substantially umbrella-shaped formation, the plurality of positions corresponding to the plurality of perspectives; and at least one controller communicatively coupled to the at least one image capture module and the at least one positioning module. The at least one controller may be configured to detect one or more edges and one or more corners of the item from a first perspective; determine whether the detected one or more edges and one or more corners of the item are detectable from at least a second perspective; and in response to a determination that the detected one or more edges and one or more corners of the item are also detectable from at least the second perspective, mark the detected one or more edges and one or more corners of the item as features to be tracked.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 8 illustrates a block diagram of an example computer program product, all arranged in accordance with at least some embodiments described herein.

DETAILED DESCRIPTION

Figure 1:
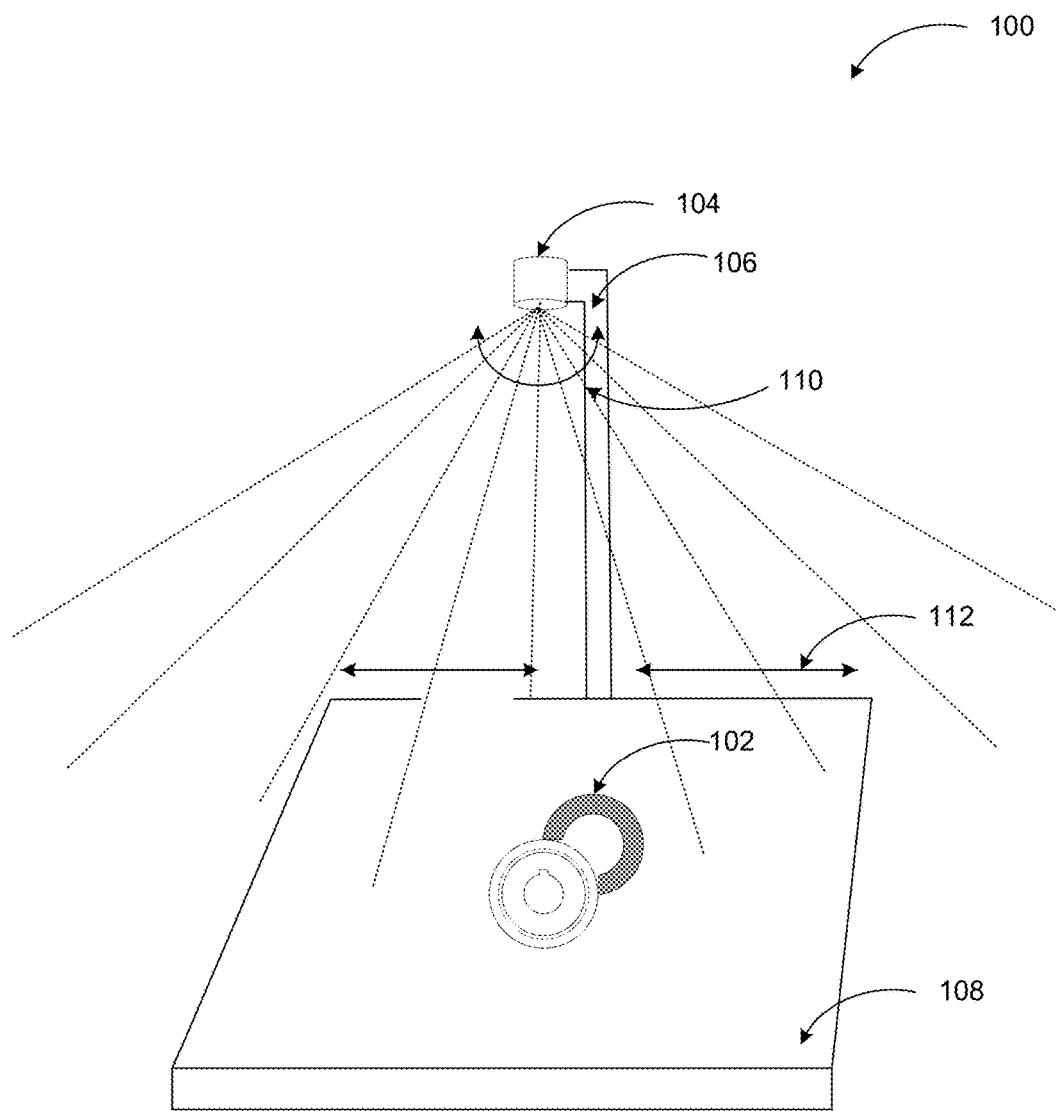
FIG. 1 illustrates an example configuration of an item detection and tracking system with stationary camera(s)

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to implementation of detection and tracking of item features.

Briefly stated, technologies are generally described for detection and tracking of item features. In some examples, features of an object may be initially found through detection of one or more edges and one or more corners of the object from a first perspective. In addition, a determination may be made whether the detected edges and corners of the object are also detectable from one or more other perspectives. In response to an affirmative determination, the detected edges and of the object may be marked as features to be tracked, for example, in subsequent frames of a camera feed. The perspectives may correspond to distributed locations in a substantially umbrella-shaped formation centered over the object. In other examples, lighting conditions of an environment where the object is being tracked may be programmatically controlled.

FIG. 1 illustrates an example configuration of an item detection and tracking system with stationary camera(s), arranged in accordance with at least some embodiments described herein.

As shown in a diagram 100, an item 102 may be identified and tracked across different frames (for example, frames of images of the item as it moves under a stationary image capture system, or the image capture system taking images of the item as it moves over the stationary item). In the illustrated example configuration, the item 102 may be stationary on a platform 108. An image capture system 104 may be affixed to a support mechanism 106 and movable along an axis 112, for example, and operable to capture different frames of images of the item 102. In other examples, the image capture system 104 may be movable along multiple axes such as two orthogonal axes planar with the platform 108. The image capture system 104 may also be moved along non-linear axes or in three dimensions.

In a training phase, the image capture system 104 may capture images of the item 102 from different perspectives 110 and identify features such as edges, corners, and basic geometric shapes within the item 102 based on a detectability of those features in all or a majority of the captured images. To accomplish the capture of images from the different perspectives 110, the image capture system 104 may be moved to different locations. Alternatively, the image capture system 104 may include a multitude of image sensors such as a complementary metal oxide semiconductor (CMOS) image sensor, a charged coupled device (CCD) image sensor, an N-type metal oxide semiconductor (NMOS) image sensor, or similar ones. The image capture system 104 may be configured to capture the images from the different perspectives 110 through digital adjustment of imaging angles or selection of different imaging sensors for each image.

Figure 2A:
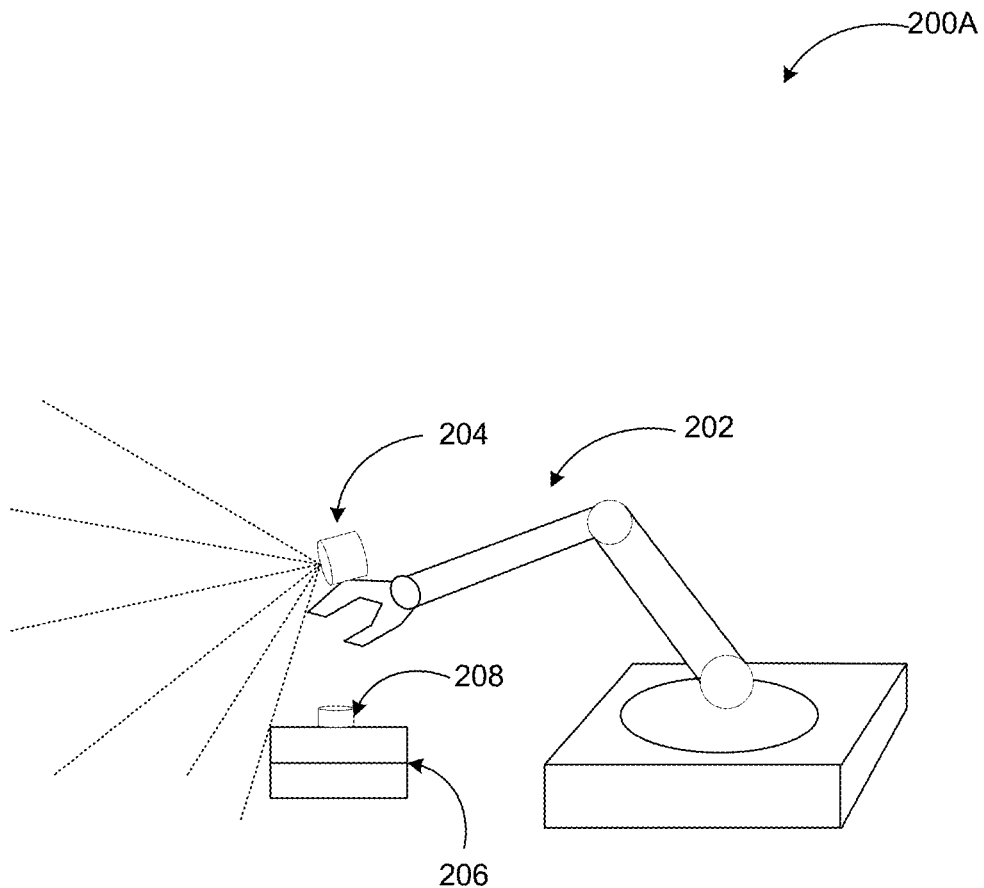
FIGS. 2A and 2B illustrate other example configurations of an item detection and tracking system with a movable camera and an umbrella-shaped camera movement representation.
Figure 2B:
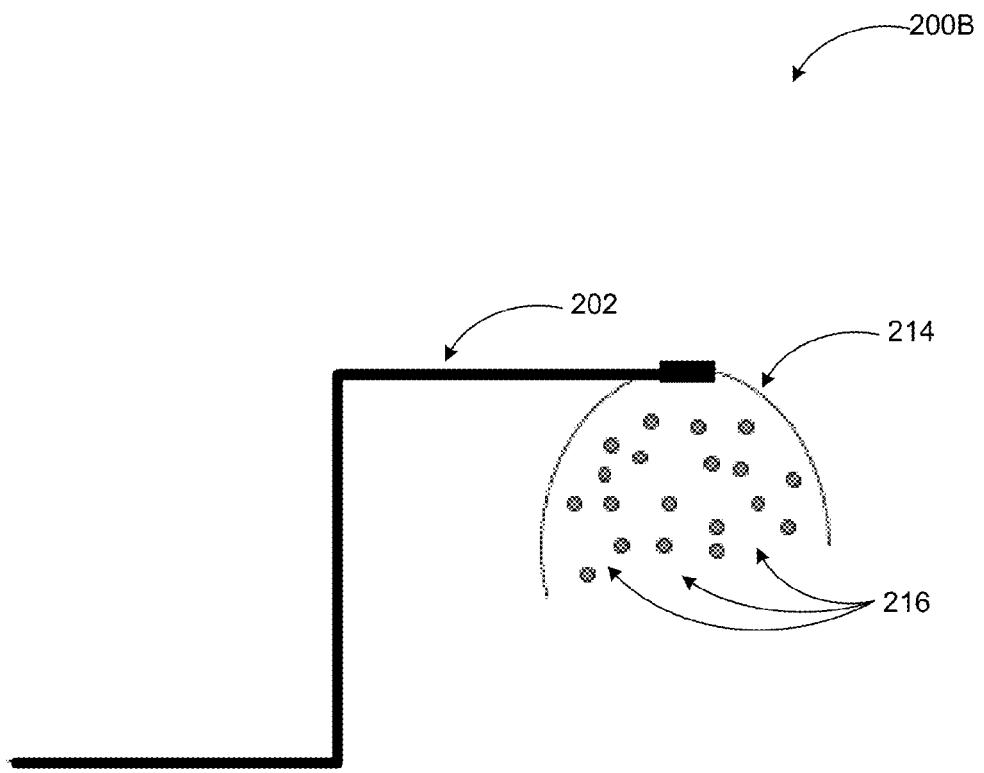

FIGS. 2A and 2B illustrate other example configurations of an item detection and tracking system with a movable camera and an umbrella-shaped camera movement representation, arranged in accordance with at least some embodiments described herein.

As shown in a diagram 200A of FIG. 2A, an image capture system 204 may be affixed to a moving support mechanism such as a robotic arm 202. As discussed above, the image capture system 204 may be moved to different locations to capture images of an item 208 on a platform 206 from different perspectives.

As shown in a diagram 200B of FIG. 2B, locations 216 for the image capture system 204 may be selected within a substantially umbrella-shaped formation 214 over the item. Each of the locations 216 within the umbrella-shaped formation 214 may correspond to a different perspective.

A controller or an analysis module configured to receive the captured image data from the image capturing system 204 may begin to detect edges and corners, as well as identify basic geometric shapes based on the detected edges and corners of the item captured in the image frames captured by the image capturing system 204 positioned or at a first location (images of the item captured from a first perspective). The first location may be, for example, at the top of the umbrella-shaped formation 214. The controller or the analysis module may then analyze images from subsequent perspectives and determine whether the same edges, corners, or features are detected in the images from the subsequent or other perspectives as well.

In some examples, detected edges, corners, and geometric features may be marked as unique identifiers of the item to be used for correlation across different frames if the detected edges, corners, and geometric features are present in all images of different perspectives during the training phase. In other examples, a confidence threshold may be defined, and the detected edges, corners, and geometric features may be marked as unique identifiers of the item if they are present in a number of images of different perspectives above the confidence threshold. For example, the image capturing system 204 may use 50 positions (thus, perspectives) to capture images of the item and detect features. The confidence threshold may be defined as 45. Thus, if the same features are detected in 45 of the 50 images from the different perspectives, they may be marked as unique identifiers. Features that are not present in at least 45 of the 50 images may be discarded as false positives.

In further examples, lighting conditions of the environment, where images of the item are captured, may be programmatically controlled. To avoid or reduce a degrading impact of sudden lighting condition changes, light sources such as light emitting diodes of a single or multiple colors may be positioned in the environment. A controller may detect changes in the lighting conditions such as darkening, a shadow on a part of the item, and control the light sources to compensate for the change in lighting intensity or light color composition.

Figure 3:
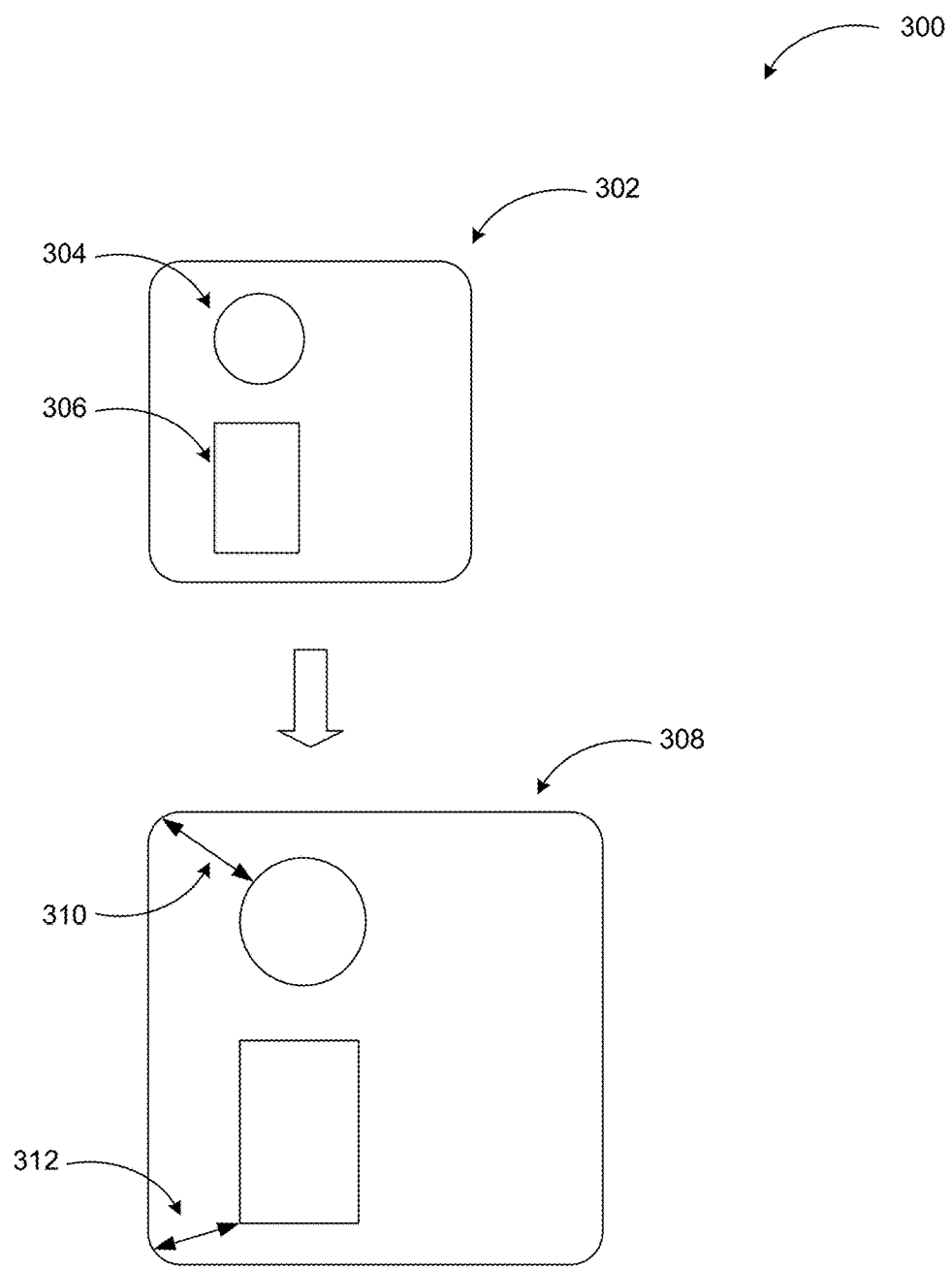
FIG. 3 illustrates an example hypothetical part with geometric features and detection thereof.

FIG. 3 illustrates an example hypothetical part with geometric features and detection thereof, arranged in accordance with at least some embodiments described herein.

As shown in a diagram 300, a hypothetical item may be represented as a basic shape 302. Edges along and within the item may be detected first based on, for example, sharp changes of brightness of pixels in an image of the item. Then, corners may be detected as intersections of edges. Based on the detected edges and corners, basic features such as a rectangle 306 and a circle 304 may be identified within the item. Next, a distance 310 between an outer edge of the item 308 and the already identified circle may be determined. Similarly, a distance 312 between the outer edge of the item 308 and the identified rectangle may also be determined. The identified features (for example, the circle 304 and the rectangle 306), as well as the distances 310 and 312 may be used as correlation metrics in tracking the item across different frames.

Figure 4:
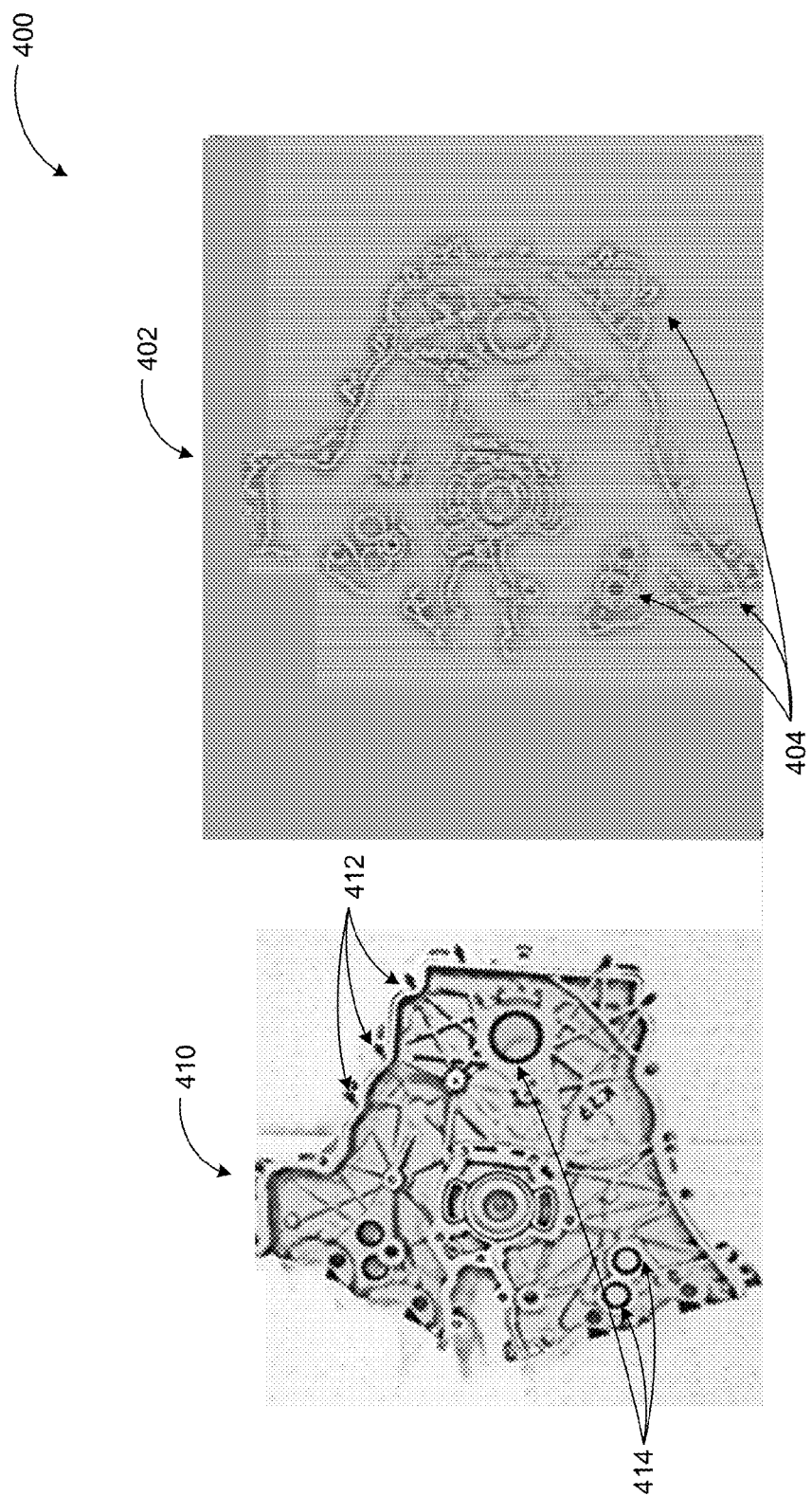
FIG. 4 illustrates detected edges on an example automotive part.

FIG. 4 illustrates detected edges on an example automotive part, arranged in accordance with at least some embodiments described herein.

Edges may be detected for item identification in a system according to some embodiments. Edges may be detected based on a sharp (or substantial) change of brightness of pixels within an image of the item being identified. Connected edges may be identified as basic geometric features such as rectangles, circles, or similar ones. As discussed above, distances of the identified geometric features from edges of the item may further be used to track the item.

As shown in a diagram 400, an automotive component 410 may include a variety of actual edges, corners, and round features within it. By taking an image of the automotive component 410 and detecting edges 412 on the image, additional features such as circles 414 may be identified. The detection of the edges and identification of the geometric features may be confirmed through correlation with other images taken from different perspectives (such as a multitude of perspectives from a three dimensional umbrella-shaped formation over the item), the detected features may be marked as unique identifiers of the automotive component 410 and used to track the automotive component 410 across multiple frames, for example, as the component moves within a field of view of a camera or as the camera moves over the stationary component.

An image 402 in the diagram 400 is a representation of the automotive component 410 using detected edges and features 404 like circles. This visual representation of detected feature data may be used for correlation across different frames. In some examples, the detection and identification of the features may be performed at a graphics processing unit (GPU) of a computing device, and the detected feature data provided to a central processing unit (CPU) of the computing device. Thus, a computational efficiency of the tracking process may be enhanced by no burdening the CPU with the entire computation and avoiding transmission of large amounts of data (edge detection data) from the GPU to the CPU for each perspective and/or frame.

Figure 5:
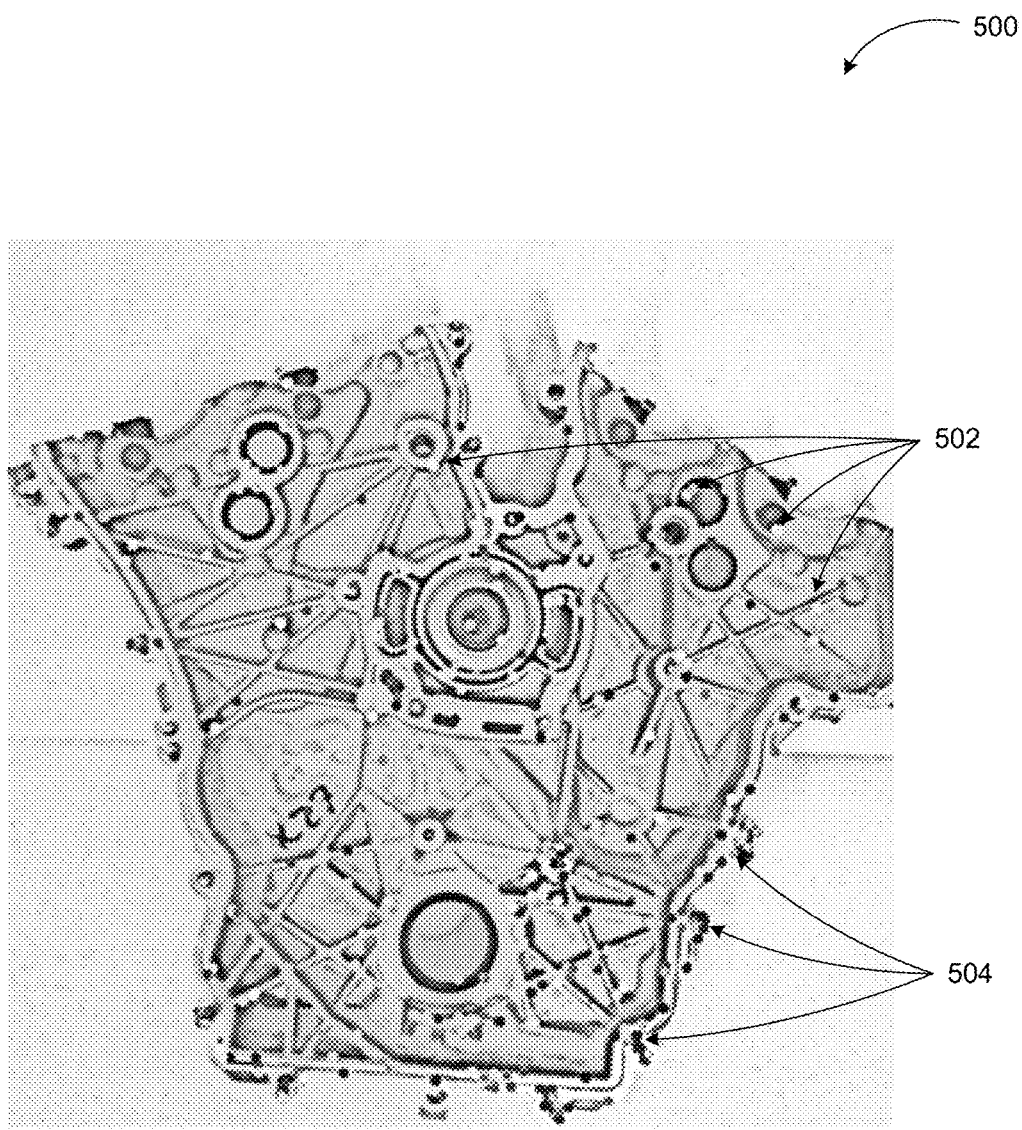
FIG. 5 illustrates detected corners on an example automotive part.

FIG. 5 illustrates detected corners on an example automotive part, arranged in accordance with at least some embodiments described herein.

In addition to detecting edges within an item, a system according to example embodiments may also detect corners as intersections of detected edges. An annulus shape may be sampled around each detected corner to confirm the detection of the corner. In some examples, a predefined correlation metric may be used to match the extracted corners from frame to frame. Correlation metrics may include squared difference, normalized squared difference, cross correlation, normalized cross correlation, or correlation coefficient.

As shown in a diagram 500, round spots 502 and 504 are used to indicate detected corner locations. In a visualization, the spots 502 and 504 may be colored or represented with various shades of gray to indicate a strength of the correlation metric (that is, a confidence level for each detected corner). For example, darker spots may indicate stronger confidence level that the detected corner is actually a corner, and lighter spots may indicate that the detected corner may be a false positive.

Figure 6:
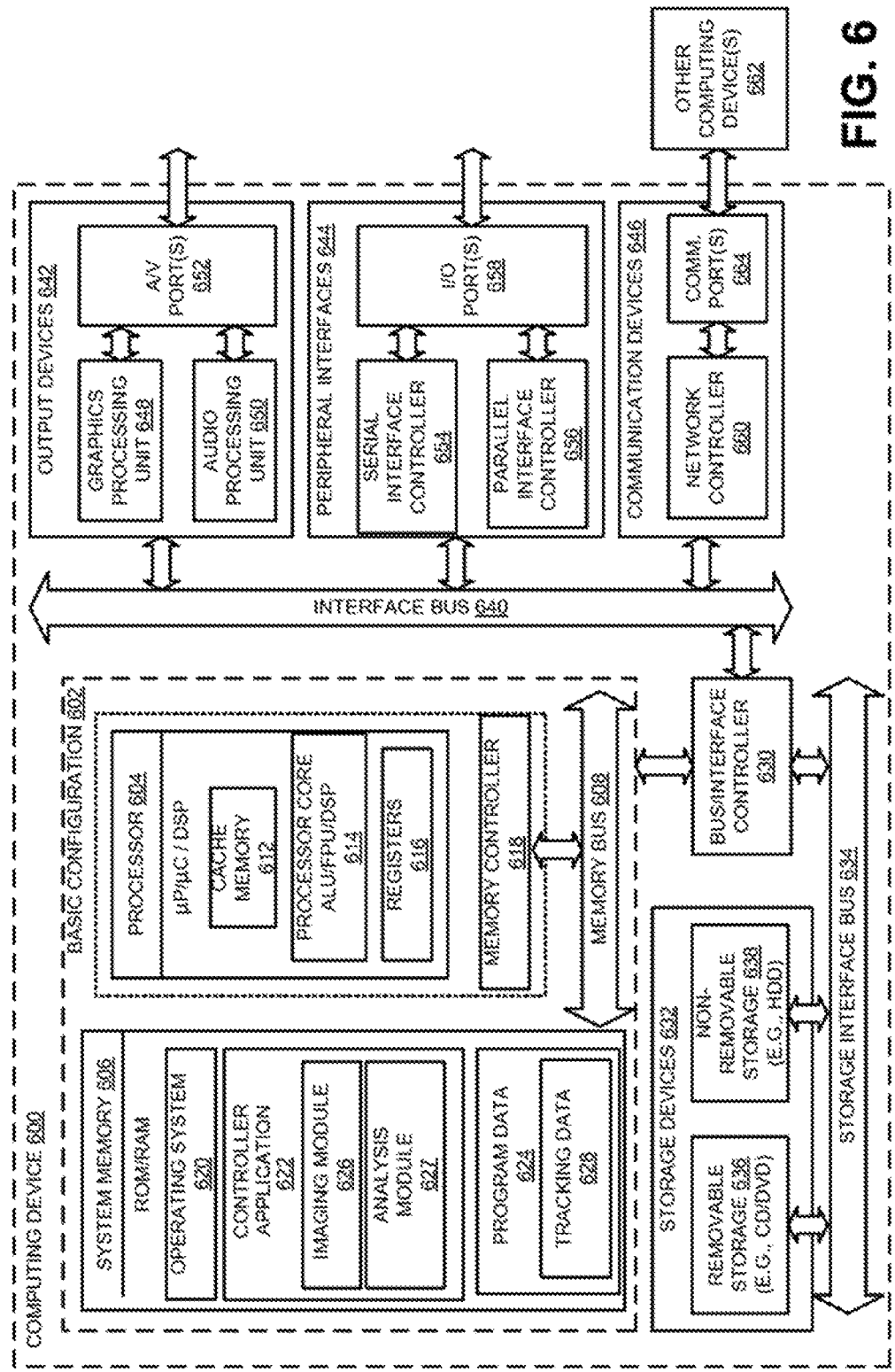
FIG. 6 illustrates a general purpose computing device, which may be used to implement detection and tracking of item features.

FIG. 6 illustrates a general purpose computing device, which may be used to implement detection and tracking of item features, arranged in accordance with at least some embodiments described herein.

For example, the computing device 600 may be used as a server, desktop computer, portable computer, smart phone, special purpose computer, or similar device such as a controller, a new component, a cluster of existing components in an operational system including a vehicle and a smart manufacturing facility. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one or more levels of caching, such as a cache memory 612, one or more processor cores 614, and registers 616. The example processor cores 614 may (each) include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a controller application 622, and program data 624. The controller application 622 may include an imaging module 626 and an analysis module 627, which may be an integral part of the application or a separate application on its own. The imaging module 626 may be configured to capture images of an item to be identified and tracked. The analysis module 627 may be configured to detect one or more edges and one or more corners of an item from a first perspective, determine whether the detected one or more edges and one or more corners of the item are detectable from at least a second perspective, and mark the detected one or more edges and one or more corners of the item as features to be tracked in response to a determination that the detected one or more edges and one or more corners of the item are detectable from the first perspective and at least the second perspective. The program data 624 may include, among other data, tracking data 628 related to the detected features of the item, as described herein.

In some examples, the detection and identification of the features may be performed at a graphics processing unit (GPU) 648 of the computing device 600, and the detected feature data provided to the processor 604. Thus, a computational efficiency of the tracking process may be enhanced by not burdening the processor 604 with the entire computation and avoiding transfer of large amounts of data (edge detection data) from the GPU 648 to the processor 604 for each perspective and/or frame.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Example computer storage media may include volatile and non-volatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to implement detection and tracking of item features. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
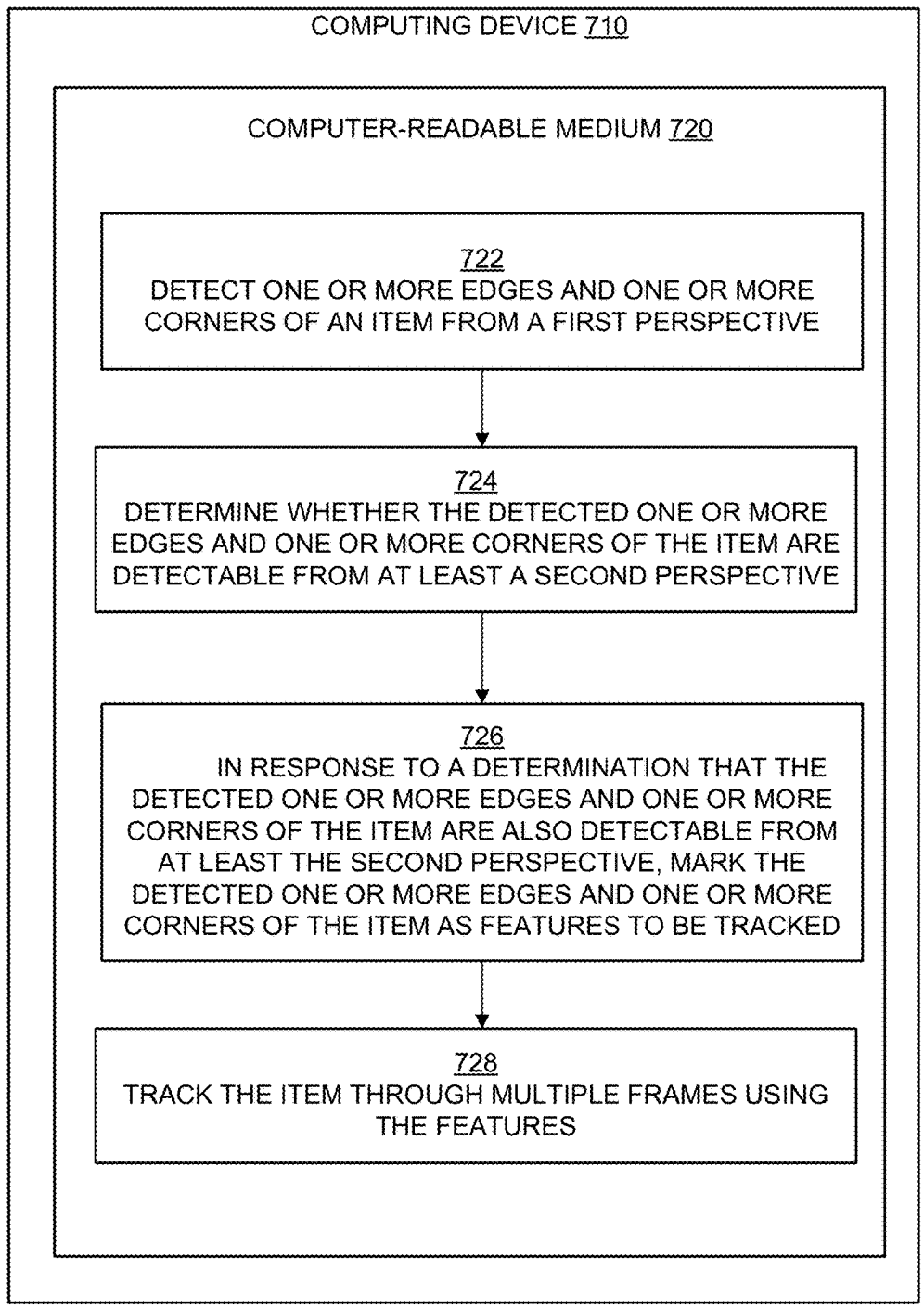
FIG. 7 is a flow diagram illustrating an example process to implement detection and tracking of item features that may be performed by a computing device such as the computing device in FIG. 6.

FIG. 7 is a flow diagram illustrating an example process to implement detection and tracking of item features that may be performed by a computing device such as the computing device in FIG. 6, arranged in accordance with at least some embodiments described herein.

Example methods may include one or more operations, functions or actions as illustrated by one or more of blocks 722, 724, 726, and/or 728. The operations described in the blocks 722 through 728 may also be stored as computer-executable instructions in a computer-readable medium such as a computer-readable medium 720 of a computing device 710.

An example process to implement detection and tracking of item features may begin with block 722, "DETECT ONE OR MORE EDGES AND ONE OR MORE CORNERS OF AN ITEM FROM A FIRST PERSPECTIVE," where the analysis module 627 may detect edges of an item based on sharp changes in brightness of pixels of an image of the item captured by the imaging module 626 from a particular perspective. The analysis module 627 may detect corners of the item based on intersections of detected edges.

Block 722 may be followed by block 724, "DETERMINE WHETHER THE DETECTED ONE OR MORE EDGES AND ONE OR MORE CORNERS OF THE ITEM ARE DETECTABLE FROM AT LEAST A SECOND PERSPECTIVE," where the analysis module 627 may analyze one or more other images of the item capture from other perspectives during a training phase and determine whether the edges and corners detected at block 722 are also detected in the other images from the other perspectives.

Block 724 may be followed by block 726, "MARK THE DETECTED ONE OR MORE EDGES AND ONE OR MORE CORNERS OF THE ITEM AS FEATURES TO BE TRACKED IN RESPONSE TO A DETERMINATION THAT THE DETECTED ONE OR MORE EDGES AND ONE OR MORE CORNERS OF THE ITEM ARE ALSO DETECTABLE FROM AT LEAST THE SECOND PERSPECTIVE," where the analysis module 627 may identify the edges and corners detected in all or a majority of the images as features of the item to be used in tracking the item. In addition, basic geometric features such as circles and rectangles may be identified based on the edges and corners within the item and marked as identifying features.

Block 726 may be followed by block 728, "TRACK THE ITEM THROUGH MULTIPLE FRAMES USING THE FEATURES," where, the identified item may be tracked across multiple frames (for example, moving item under stationary camera or moving camera over stationary item) using the features identified during the training phase.

The blocks included in the above described process are for illustration purposes. Detection and tracking of item features may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 8 illustrates a block diagram of an example computer program product, arranged in accordance with at least some embodiments described herein.

In some embodiments, as shown in FIG. 8, the computer program product 800 may include a signal bearing medium 802 that may also include one or more machine readable instructions 804 that, when executed by, for example, a processor, may provide the functionality described herein. Thus, for example, referring to the processor 604 in FIG. 6, imaging module 626 and analysis module 627 executed on the processor 604 may undertake one or more of the tasks shown in FIG. 8 in response to the instructions 804 conveyed to the processor 604 by the signal bearing medium 802 to perform actions associated with implementation of sensor-based safety features for equipment as described herein. Some of those instructions may include, for example, one or more instructions detect one or more edges and one or more corners of an item from a first perspective, determine whether the detected one or more edges and one or more corners of the item are detectable from at least a second perspective, and mark the detected one or more edges and one or more corners of the item as features to be tracked in response to a determination that the detected one or more edges and one or more corners of the item are detectable from the first perspective and at least the second perspective.

In some implementations, the signal bearing medium 802 depicted in FIG. 8 may encompass a computer-readable medium 806, such as, but not limited to, a hard disk drive (HDD), a solid state drive (SSD), a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (for example, a fiber optic cable, a waveguide, a wired communication link, a wireless communication link, etc.). Thus, for example, the computer program product 800 may be conveyed to one or more modules of the processor 604 of FIG. 6 by an RF signal bearing medium, where the signal bearing medium 802 is conveyed by the wireless communications medium 810 (for example, a wireless communications medium conforming with the IEEE 802.11 standard).

According to some examples, methods to implement detection and tracking of item features are described. Example methods may include detecting one or more edges and one or more corners of an item from a first perspective, determining whether the detected one or more edges and one or more corners of the item are detectable from at least a second perspective, and marking the detected one or more edges and one or more corners of the item as features to be tracked in response to a determination that the detected one or more edges and one or more corners of the item are also detectable from at least the second perspective.

According to other examples, the methods may include determining whether the detected one or more edges and one or more corners of the item are detectable from a plurality of perspectives and selecting the plurality of perspectives from randomly distributed locations in a substantially umbrella-shaped formation centered over the item. The first perspective may be from a particular location of the umbrella-shaped formation. Detecting the one or more edges and one or more corners of the item may include detecting the one or more edges based on a substantial change of brightness of pixels in a captured image of the item.

According to further examples, detecting the one or more edges and one or more corners of the item may further include detecting the one or more corners as intersections of pairs of detected edges. The methods may also include tracking the item through at least two captured image frames based on correlating the detected one or more edges and one or more corners, determining one or more geometric features within the item based on the detected one or more edges and one or more corners, and/or determining an edge distance from an edge of each determined geometric feature to a nearest outer edge of the item.

According to yet other examples, the methods may include tracking the item through at least two captured image frames based on correlating the one or more geometric features and corresponding edge distances, detecting a change in a lighting intensity or a lighting color composition in an environment where the item is being detected, compensating for the detected change in the lighting intensity or the lighting color composition using one or more light sources in the environment, and/or compensating for the detected change in the lighting intensity or the lighting color composition simultaneously with the detecting of the one or more edges and one or more corners of the item.

According to other examples, an apparatus configured to implement detection and tracking of item features is described. An example apparatus may include at least on image capture module configured to capture images of an item from a plurality of perspectives and at least one analysis module communicatively coupled to the at least on image capture module. The at least one analysis module may be configured to detect one or more edges and one or more corners of the item from a first perspective, determine whether the detected one or more edges and one or more corners of the item are detectable from at least a second perspective, and mark the detected one or more edges and one or more corners of the item as features to be tracked in response to a determination that the detected one or more edges and one or more corners of the item are also detectable from at least the second perspective.

According to some examples, the at least on image capture module may include a plurality of image capture sensors positioned at a plurality of locations in a substantially umbrella-shaped formation centered over the item. The plurality of perspectives may correspond to the plurality of locations in the substantially umbrella-shaped formation centered over the item. The first perspective may correspond to a particular location of the umbrella-shaped formation.

The apparatus may further include a positioning module configured to move the at least one image capture module to a plurality of positions in a substantially umbrella-shaped formation, where the plurality of perspectives correspond to the plurality of locations in the substantially umbrella-shaped formation centered over the item.

According to other examples, the plurality of locations may be distributed in the substantially umbrella-shaped formation centered over the item through a random distribution or a Gaussian distribution. The at least one image capture module may include at least one of a complementary metal oxide semiconductor (CMOS) image sensor, a charged coupled device (CCD) image sensor, and an N-type metal oxide semiconductor (NMOS) image sensor. The at least one analysis module may be further configured to detect the one or more edges based on a substantial change of brightness of pixels in a captured image of the item and detect the one or more corners as intersections of pairs of detected edges. The at least one analysis module may also be configured to determine one or more geometric features of the item based on the detected one or more edges and one or more corners; and determine an edge distance from an edge of each determined geometric feature to a nearest outer edge of the item.

According to yet further examples, the one or more geometric features may include one or more of a rectangle and a circle. The at least one analysis module may be further configured to track the item through a plurality of captured image frames based on one or more of a correlation of the one or more geometric features and corresponding edge distances, a correlation of the detected one or more edges, and a correlation of the detected one or more corners. The apparatus may also include a lighting module communicatively coupled to the at least one analysis module. The lighting module may be configured to detect a change in a lighting intensity or a lighting color composition in an environment where the item is being detected and compensate for the detected change in the lighting intensity or the lighting color composition using one or more light sources in the environment. The one or more light sources may include light emitting diodes (LEDs) of one or more colors.

According to further examples, a system to implement detection and tracking of item features is described. An example system may include at least on image capture module configured to capture images of an item from a plurality of perspectives; at least one positioning module mechanically coupled to the at least one image capture module, the at least one positioning module configured to move the at least one image capture module to a plurality of positions in a substantially umbrella-shaped formation, the plurality of positions corresponding to the plurality of perspectives; and at least one controller communicatively coupled to the at least one image capture module and the at least one positioning module. The at least one controller may be configured to detect one or more edges and one or more corners of the item from a first perspective; determine whether the detected one or more edges and one or more corners of the item are detectable from at least a second perspective; and in response to a determination that the detected one or more edges and one or more corners of the item are also detectable from at least the second perspective, mark the detected one or more edges and one or more corners of the item as features to be tracked.

According to some examples, the at least one controller may be further configured to detect the one or more edges based on a substantial change of brightness of pixels in a captured image of the item and detect the one or more corners as intersections of pairs of detected edges. The at least one controller may also be configured to determine one or more geometric features within the item based on the detected one or more edges and one or more corners and determine an edge distance from an edge of each determined geometric feature to a nearest outer edge of the item. The at least one controller may further be configured to track the item through a plurality of captured image frames based on one or more of a correlation of the one or more geometric features and corresponding edge distances, a correlation of the detected one or more edges, and a correlation of the detected one or more corners.

According to yet other examples, the system may further include one or more light sources communicatively coupled to the at least one controller, where the at least one controller is further configured to through the at least one image capture module, detect a change in a lighting intensity or a lighting color composition in an environment where the item is being detected and through the one or more light sources, compensate for the detected change in the lighting intensity or the lighting color composition. The at least one controller may include a graphics processing unit (GPU) and a central processing unit (CPU), where the GPU is configured to mark the detected one or more edges and corners as features to be tracked; and provide a list of the features to the CPU for frame-by-frame tracking.

EXAMPLES

Following are illustrative examples of how some embodiments may be implemented, and are not intended to limit the scope of embodiments in any way.

Example 1: Identification of Components in an Automotive Manufacturing Plant

Robotic assembly stations are a common feature of automotive manufacturing plants. Complex robotic assembly systems can process a multitude of components that are typically delivered through a moving band to each assembly station. In such a manufacturing plant, different break assembly components may be provided to a robotic assembly station for assembly into a break assembly. Each of the provided break components may have various forms and shapes and due to the configuration of the supply system, there is no uniformity of which component is delivered when to the robotic assembly system. Furthermore, the robotic assembly station is configured to assemble different break assemblies for different types of cars.

A tracking system includes an initial identification camera attached to a robotic arm and three subsequent cameras along the delivery band, all connected to a controller. During a training phase, the initial identification camera captures images of all break components that may be delivered to the robotic assembly station from different perspectives as the robotic arm holding the camera is moved along multiple locations of an umbrella-shaped formation. The controller identifies edges and corners of each break part and uses the detected features to track the components as they move along the band to the robotic assembly station. Thus, the robotic assembly station is notified which part it is about to receive and a position of the part on the delivery band before the part arrives. Based on the information, the robotic assembly station can determine which break assembly it is supposed to work on and configure its assembly process accordingly without a need for delivering all part to the robotic assembly station in any particular order or position.

Example 2: Identification of Dangerous Items within Luggage in an Airport Luggage Delivery System Major airports move large numbers of luggage between airplanes and baggage claim stations each day. At least a portion of the luggage is screened using X-rays or similar technology for security reasons. However, luggage may have to be taken offline or delivery speeds slowed for inspection. On the other hand, speedy delivery of luggage from plane to plane or from plane to baggage claim is important for smooth airport operations and passenger experience, especially in larger airports where thousands of flights may take off and land each day.

A tracking system placed in multiple locations over the luggage delivery system of an airport includes two types of cameras. First type are cameras that are capable of capturing x-ray images of luggage from different perspectives. Second type of less sophisticated cameras are capable of capturing images from a single perspective. The second type of cameras are positioned more frequently than the first type along the delivery bands, which operate at speeds approaching 50 km/h. All cameras are communicatively coupled to a central controller via wireless communication such as IEEE 802.11 communications.

The first type of cameras identify items within luggage and compare features of the items to known dangerous items such as weapons, explosive material containers, or illegal items such as frequently smuggled items (for example, elephant tusks). If a first type of camera detects a suspicious item, the luggage containing that item is tracked throughout the system by the second type of cameras (or other first type of cameras) and the controller determines where the luggage is headed. The controller then notifies airport security about the suspicious luggage, so that the airport security can pull the luggage offline at a convenient point (for example, at the baggage claim or before it is loaded to a plane) and inspect without disrupting or slowing down the entire luggage delivery system.

Example 3: Tracking of Sub-Assemblies in an Electronic Manufacturing Plant Part Distribution System Electronic manufacturing plants can produce large numbers of electronic devices of various types. Even devices of the same type typically have various versions based on different production configurations. Thus, a highly automated and reliable part distribution system can be essential for an electronic assembly plant. Many of the assembly operations are performed by robots. Even human operators may not always be capable of distinguishing different parts and sub-assemblies leading to inefficiencies in the assembly process.

A large consumer electronics assembly plant manufactures televisions, computer monitors, tablet computers, and other devices. While some end products share same sub-assemblies, other end products of the same type include different sub-assemblies due to their configuration (for example, an Internet-ready television includes a wireless communication module, while a non-Internet-ready version of the same television does not include the same module). The plant has a built-in automatic delivery system that delivers components and sub-assemblies to different assembly stations automatically and at high speed.

A tracking system includes an identification camera at the main input of the distribution system to identify parts and sub-assemblies as they are fed into to the distribution system. The identification camera includes multiple sensors at different locations, which capture images of each part of sub-assembly from a different perspective simultaneously as the part passes under the camera. A multi-core server processes the captured images, identifies the edges and corners, as well as basic geometric shapes. The identification information is then compared with captured images from other cameras with single image capture sensor along the path of the distribution system, specifically at branching points. Thus, the server can determine which part or sub-assembly is being delivered to which assembly station. If a part of sub-assembly is delivered to the wrong assembly station, an alert is issued to that station as well as a monitor preventing mis-assembly of end products.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to detect and track item features, the method comprising:
   selecting a plurality of perspectives from randomly distributed locations in a substantially umbrella-shaped formation centered over an item;
   detecting one or more edges and one or more corners of the item from a first perspective of the plurality of perspectives;
   determining whether the one or more edges and the one or more corners of the item are detectable from at least a second perspective of the plurality of perspectives;
   in response to a determination that the one or more edges and the one or more corners of the item are detectable from the at least the second perspective of the plurality of perspectives, marking the one or more edges and the one or more corners of the item as features to be tracked; and
   tracking the item through at least two captured image frames based on a correlation of the one or more edges and the one or more corners.

2. The method of claim 1, wherein detecting the one or more edges and the one or more corners of the item comprises:
   detecting the one or more edges based on a substantial change of brightness of pixels in a captured image of the item.

3. The method of claim 1, wherein detecting the one or more edges and the one or more corners of the item comprises:
   detecting the one or more corners as intersections of pairs of the one or more edges.

4. The method of claim 1, further comprising:
   determining one or more geometric features within the item based on the one or more edges and the one or more corners.

5. The method of claim 4, further comprising:
   determining an edge distance from an edge of each determined geometric feature, of the one or more geometric features, to a nearest outer edge of the item.

6. A method to detect and track item features, the method comprising:
   detecting one or more edges and one or more corners of an item from a first perspective;
   determining whether the one or more edges and the one or more corners of the item are detectable from at least a second perspective;
   in response to a determination that the one or more edges and the one or more corners of the item are detectable from the at least the second perspective, marking the one or more edges and the one or more corners of the item as features to be tracked;
   determining one or more geometric features within the item based on the marked one or more edges and the marked one or more corners of the item;
   determining an edge distance from an edge of each determined geometric feature, of the one or more geometric features, to a nearest outer edge of the item; and
   tracking the item through at least two captured image frames based on a correlation of the one or more geometric features and corresponding edge distances.

7. The method of claim 1, further comprising:
   detecting a change in a lighting intensity or a lighting color composition in an environment in which the item is detected.

8. The method of claim 7, further comprising:
   compensating for the detected change in the lighting intensity or the lighting color composition by using one or more light sources in the environment.

9. An apparatus configured to detect and track item features, the apparatus comprising:
   at least one image capture module that comprises a plurality of image sensors positioned at a plurality of locations in a substantially umbrella-shaped formation centered over an item, wherein the at least one image capture module is configured to capture images of the item from a plurality of perspectives; and
   at least one analysis module communicatively coupled to the at least one image capture module, wherein the at least one analysis module is configured to:
     detect one or more edges and one or more corners of the item from a first perspective;
     in response to a detection of a change in a lighting intensity or a lighting color composition in an environment in which the one or more edges and the one or more corners of the item are being detected, compensate for the detected change by use of one or more light sources;
     determine whether the one or more edges and the one or more corners of the item are detectable from at least a second perspective; and
     in response to a determination that the one or more edges and the one or more corners of the item are detectable from the at least the second perspective, mark the one or more edges and the one or more corners of the item as features to be tracked.

10. The apparatus of claim 9, wherein the plurality of perspectives correspond to the plurality of locations in the substantially umbrella-shaped formation centered over the item.

11. The apparatus of claim 10, wherein the first perspective corresponds to a particular location of the substantially umbrella-shaped formation.

12. An apparatus configured to detect and track item features, the apparatus comprising:
    at least one image capture module that comprises a plurality of image sensors, wherein the at least one image capture module is configured to capture images of an item from a plurality of perspectives;
    a movable support configured to move the at least one image capture module to a plurality of positions in a substantially umbrella-shaped formation centered over the item, wherein the plurality of perspectives correspond to the plurality of positions in the substantially umbrella-shaped formation; and
    at least one analysis module communicatively coupled to the at least one image capture module, wherein the at least one analysis module is configured to:
      detect one or more edges and one or more corners of the item from a first perspective;

in response to a detection of a change in a lighting intensity or a lighting color composition in an environment in which the one or more edges and the one or more corners of the item are being detected, compensate for the detected change by use of one or more light sources;

determine whether the one or more edges and the one or more corners of the item are detectable from at least a second perspective; and in response to a determination that the one or more edges and the one or more corners of the item are detectable from the at least the second perspective, mark the one or more edges and the one or more corners of the item as features to be tracked.

13. The apparatus of claim 9, wherein the plurality of image sensors comprises at least one of a complementary metal oxide semiconductor (CMOS) image sensor, a charged coupled device (CCD) image sensor, and an N-type metal oxide semiconductor (NMOS) image sensor.

14. The apparatus of claim 9, wherein the one or more light sources include light emitting diodes (LEDs) of one or more colors.

15. A system to detect and track item features, the system comprising:

at least one image capture module that comprises a plurality of image sensors, wherein the at least one image capture module is configured to capture images of an item from a plurality of perspectives;

at least one movable support mechanically coupled to the at least one image capture module, wherein the at least one movable support is configured to move the at least one image capture module to a plurality of positions in a substantially umbrella-shaped formation, wherein the plurality of positions correspond to the plurality of perspectives; and at least one processor communicatively coupled to the at least one image capture module and the at least one movable support, wherein the at least one processor is configured to:

detect one or more edges and one or more corners of the item from a first perspective;

in response to a detection of a change in a lighting intensity or a lighting color composition in an environment in which the one or more edges and the one or more corners of the item are being detected, compensate for the detected change by use of one or more light sources;

determine whether the one or more edges and the one or more corners of the item are detectable from at least a second perspective; and in response to a determination that the one or more edges and the one or more corners of the item are detectable from the at least the second perspective, mark the one or more edges and the one or more corners of the item as features to be tracked.

16. The system of claim 15, wherein the at least one processor is configured to:

detect the one or more edges based on a substantial change of brightness of pixels in a captured image of the item; and detect the one or more corners as intersections of pairs of the one or more edges.

17. The system of claim 15, wherein the at least one processor is further configured to:

determine one or more geometric features within the item based on the one or more edges and the one or more corners; and determine an edge distance from an edge of each determined geometric feature, of the one or more geometric features to a nearest outer edge of the item.

18. The system of claim 15, wherein the at least one processor comprises a graphics processor and a central processor, and wherein the graphics processor is configured to:

mark the one or more edges and the one or more corners as features to be tracked; and provide a list of the features to the central processor for frame-by-frame tracking.

\* \* \* \* \*

UNITED STATES PATENT AND TRADEMARK OFFICE
CERTIFICATE OF CORRECTION

PATENT NO. : 9,734,401 B2
APPLICATION NO. : 14/432466
DATED : August 15, 2017
INVENTOR(S) : Hunt It is certified that error appears in the above-identified patent and that said Letters Patent is hereby corrected as shown below:

In the Specification

In Column 7, Line 18, delete "(HDD)," and insert -- (HDDs), --, therefor.

In Column 7, Line 20, delete "(SSD)," and insert -- (SSDs), --, therefor.

In the Claims

In Column 20, Line 30, in Claim 17, delete "features to" and insert -- features, to --, therefor.

Signed and Sealed this
Sixteenth Day of January, 2018

Joseph Matal
*Performing the Functions and Duties of the*
*Under Secretary of Commerce for Intellectual Property and*
*Director of the United States Patent and Trademark Office*